United States Patent Office 2,801,274
Patented July 30, 1957

2,801,274

MANUFACTURE OF SPONGE RUBBER FROM FOAMED RUBBER LATEX

Eugene J. Bethe, Mishawaka, Ind., assignor to United States Rubber Company, New York, N. Y., a corporation of New Jersey No Drawing. Application October 15, 1953, Serial No. 386,393

3 Claims. (Cl. 260—723)

This invention relates to the manufacture of sponge rubber from foamed rubber latex.

Sponge rubber is commonly made by preparing a fluid latex foam containing compounding ingredients such as sulfur, zinc oxide, accelerator, antioxidant, and foaming agent, and a gelling agent such as sodium silicofluoride, converting the foam into the desired shape as by pouring in molds or spreading on a travelling belt, permitting the shaped foam to set to an irreversible gel at room temperature, and vulcanizing the gelled foam at elevated temperature to form sponge rubber. The latex is compounded so that there is sufficient time after formation of the foam containing the gelling agent to shape the foam as by pouring the foam from a mixing tub into molds or onto a spreader or belt before the foam sets up to an irreversible gel by virtue of the gelling agent. Therefore, the minimum room temperature gelling time must be at least equal to the time it takes to mix the gelling agent plus the time it takes to pour the batch of foam. In practice this will generally be 3 to 7 minutes longer, particularly in continuous operations. However, it is desired to gel the foam as soon after shaping as possible to maintain the quality and fine structure of the poured foam, and to prevent coarsening of the foam before gelling. Heating to hasten the gelling of the shaped foam is unsatisfactory because the resulting structure is often non-uniform in character due to the fact that the amount of heat reaching the center of the foam is not the same as the amount of heat applied to the surfaces of the foam. On the other hand, if foam is gelled at room temperature with a high amount of gelling agent, such as sodium silicofluoride, then although the advantages of better structure, better skin and better surfaces are obtained, this method is also accompanied with disadvantages of a short handling time, more scrap due to this short handling time and to the overflow often gelling before it can be salvaged, more lumps in stock, and the possibility of entire sheets of stock being spoiled if the foam gels before the operators have finished handling the foam.

According to the present invention, ample time is had to prepare the foam containing the gelling agent and shape the same, but with an accelerated gelling of the shaped foam after pouring. This is accomplished by gelling the foam containing the gelling agent after shaping the same in an atmosphere of carbon dioxide which accelerates the gelling of the shaped foam.

In carrying out the present invention, the latex is formed into a fluid foam containing a gelling agent which is capable of irreversibly gelling the foam in air, generally within an hour, and the sensitized foam is shaped as by pouring in molds or on a belt or spreader, and the thus shaped foam is gelled in an atmosphere of at least 50% by volume of carbon dioxide, and preferably straight carbon dioxide. The carbon dioxide is preferably merely the atmosphere that surrounds the molds or other shaping devices for the foam at the time of gelling of the foam. If desired, provision may be made for forcing the carbon dioxide through the shaped sponge to further accelerate the gelling. It is preferred that the gelling take place at room temperature, and the gelled foam then vulcanized at elevated temperature, but the gelling may, if desired, be made to take place at an elevated temperature to accelerate the gelling with less tendency to cause distortion of the shaped foam than where heat is used to accelerate the gelling time in a non-coagulating atmosphere, such as air. The carbon dioxide acts as an auxiliary gelling agent to the gelling agent, such as sodium silicofluoride, contained in the foam, and thus differs greatly from those cases where carbon dioxide is the sole coagulant of a latex film, or of an uncoagulated latex foam that is first made rigid by freezing before coagulating the latex in the uncoagulated frozen foam with carbon dioxide.

The latex foam containing the gelling agent is generally prepared in known manner by whipping air into the compounded latex until the desired foam density has been obtained. The gelling agent, such as sodium silicofluoride, is generally separately mixed into the whipped foam before shaping, but it may be incorporated in the latex before foaming. The foam may be separately prepared and then the compounded latex containing the gelling agent mixed into the pre-formed foam before shaping. The preferred gelling agent, sodium silicofluoride, is usually present in amount from 0.5 to 4 parts by weight per 100 parts by weight of rubber of the latex to give a gelling time of the latex containing the gelling agent of less than one hour at room temperature (e. g. 70° F.–80° F.)

The rubber latex for the preparation of sponge cushions according to the present invention may be natural rubber latex or a butadiene polymer synthetic rubber latex or mixtures of the same. Such butadiene polymer synthetic rubber latex may be an aqueous emulsion polymerizate of various butadienes-1,3, for example, butadiene-1,3, isoprene, chloroprene, piperylene, 2,3-dimethyl-butadiene-1,3, or mixtures thereof, or mixtures of one or more such butadienes-1,3 with one or more polymerizable compounds which are capable of forming rubbery copolymers with butadienes-1,3, for example, up to 70% of such mixture of compounds which contain a $CH_2=C<$ group where at least one of the disconnected valences is attached to an electroactive group, that is, a group which substantially increases the electrical dissymmetry or polar character of the molecule. Examples of compounds which contain a $CH_2=<$ group are copolymerizable with butadienes-1,3 are aryl olefins, such as styrene, alpha methyl styrene, para-chlorostyrene, dichlorostyrene, and vinyl naphthalene; the alphamethylene carboxylic acids, and their esters, nitriles and amides, such as acrylic acid, methyl acrylate, methyl methacrylate, acrylonitrile, methacrylonitrile, methacrylamide; isobutylene; methyl vinyl ether; methyl vinyl ketone; vinylidene chloride.

The following illustrates the present invention:

A natural rubber latex of 62.5% solids concentration was compounded according to the following dry weight formulation, the compounding ingredients being added as conventional aqueous solutions or pastes: 100 parts of rubber, 0.1 part of potassium ferrocyanide (stabilizer), 0.9 part of potassium oleate, 1 part of castor oil soap, 0.5 part of Trimene Base accelerator which is a reaction product of ethyl chloride and formaldehyde and ammonia (used as a sensitizer), 2.4 parts of sulfur, 6 parts of zinc oxide, 1.3 parts of the zinc salt of 2-mercaptobenzothiazole and 0.7 part of zinc ethyl dithiocarbamate (accelerators), 1 part of antioxidant, 20 parts of clay filler, 1 part of titanium dioxide pigment and 4 parts of wax. The compounded latex of 138.9 parts dry weight contained 60.5% solids. The latex was whipped into a foam.

When the foam without gelling agent was poured into a pan-shaped mold and placed in a closed compartment that had been flushed out with carbon dioxide, i. e. where the carbon dioxide was the sole gelling agent, the foam gelled but the resulting sponge structure was unsatisfactory, being coarse and weak.

An aqueous slurry containing 0.75 part dry weight of sodium silicofluoride (25% concentration) was added to 138.9 parts dry weight of the latex foam (i. e. 100 parts dry weight of rubber of the latex foam). The foam was divided in two molds. The foam in one mold was allowed to gel in air at room temperature (76° F.) and the foam in the other was allowed to gel at room temperature (76° F.) in the compartment that had been swept out with $CO_2$. The foam in the air gelled in 55 minutes, whereas the foam in the carbon dioxide atmosphere gelled in 3 minutes. With 1.5 parts dry weight of sodium silicofluoride per 100 parts dry weight of rubber of the latex foam the room temperature time of gelling of the foam in air was 30 minutes and in the carbon dioxide atmosphere was 4 minutes. With 1.5 parts dry weight of sodium silicofluoride and also 0.38 part dry weight of Trimene Base added in the sodium silicofluoride slurry per 100 parts dry weight of rubber in the foam, the time of gelling of the foam in air at 76° F. was 30 minutes and in carbon dioxide at 76° C. was 6 minutes. With 2.5 parts dry weight of sodium silicofluoride and 0.38 part dry weight of Trimene Base per 100 parts dry weight of rubber in the foam, the gelling time of the foam in air was 13 minutes and in carbon dioxide was 4 minutes. With 2 parts dry weight of sodium silicofluoride and 0.38 part dry weight of Trimene Base per 100 parts dry weight of rubber in the foam, the gelling time in air at 71° F. was 15.5 minutes and in carbon dioxide at 91° F. was 5 minutes. With 3 parts dry weight of sodium silicofluoride and 0.38 part dry weight of Trimene Base per 100 parts dry weight of rubber in the foam, the gelling time in air at 71° F. was 10 minutes and in carbon dioxide at 91° F. was 4.5 minutes. With 4 parts dry weight of sodium silicofluoride and 0.38 part dry weight of Trimene Base per 100 parts dry weight of rubber in the foam, the gelling time in air at 74° F. was 7 minutes and in carbon dioxide at 89° F. was 3 minutes. The shorter gel time in carbon dioxide gave the advantage of better quality, finer structure, better top surface and better skin where stripped from the molds, than where gelling took place in the air.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of making foam rubber sponge articles which comprises whipping a rubber latex which is coagulable by carbon dioxide into a fluid pourable foam containing a gelling agent which is capable of irreversibly gelling the foam after pouring into the desired shape in from 3 minutes to less than one hour in air at room temperature, pouring the foam into the desired shape before the gelling takes place, then providing the thus shaped foam also before the gelling takes place with an atmosphere comprising at least 50% by volume of carbon dioxide to accelerate the gelling and to cause the gelling of the foam before its normal gelling time, and vulcanizing the gelled foam.

2. The method of making foam rubber sponge articles which comprises whipping a rubber latex which is coagulable by carbon dioxide into a fluid pourable foam containing a gelling agent which is capable of irreversibly gelling the foam after pouring into the desired shape in from 7 to 55 minutes in air at room temperature, pouring the foam into the desired shape before the gelling takes place, then providing the thus shaped foam also before the gelling takes place with an atmosphere comprising at least 50% by volume of carbon dioxide to accelerate the gelling of the foam and to cause the foam to gel before its normal gelling time, and vulcanizing the gelled foam.

3. The method of making foam rubber sponge articles which comprises whipping a rubber latex which is coagulable by carbon dioxide into a fluid pourable foam containing 0.5 to 4 parts by weight of sodium silicofluoride gelling agent per 100 parts by weight of rubber of the latex, said latex being capable of irreversibly gelling the foam after pouring into the desired shape in from 7 to 55 minutes in air at room temperature, pouring the foam into the desired shape before the gelling takes place, then providing the thus shaped foam also before the gelling takes place with an air atmosphere comprising at least 50% by volume of carbon dioxide to accelerate the gelling of the foam and to cause the foam to gel before its normal gelling time, and vulcanizing the gelled foam.

References Cited in the file of this patent

UNITED STATES PATENTS

| | | |
|---|---|---|
| 2,217,605 | Carter | Oct. 8, 1940 |
| 2,346,055 | Taylor | Apr. 4, 1944 |
| 2,432,353 | Talalay | Dec. 9, 1947 |
| 2,604,663 | Talalay | July 29, 1952 |
| 2,640,036 | Brass et al. | May 26, 1953 |

FOREIGN PATENTS

| | | |
|---|---|---|
| 411,202 | Great Britain | June 7, 1934 |